United States Patent Office 3,754,053
Patented Aug. 21, 1973

3,754,053
POLYOXYMETHYLENE-OXYALKYLENE BLOCK POLYMERS
Raymond J. Kray, Berkeley Heights, and Robert W. Stevenson, Edison, N.J., assignors to Celanese Corporation of America, New York, N.Y.
No Drawing. Continuation-in-part of application Ser. No. 860,717, Dec. 21, 1959. This application May 15, 1964, Ser. No. 367,872
Int. Cl. C08g 1/14, 1/16/, 11/00
U.S. Cl. 260—823
30 Claims

ABSTRACT OF THE DISCLOSURE

This application relates to block copolymers and more particularly to block copolymers having polyoxymethylene segments and segments having recurring oxyalkylene groups with more than one carbon atom.

CROSS-REFERENCES TO RELATED APPLICATIONS

This application is a continuation-in-part of our now abandoned application, Ser. No. 860,717, filed Dec. 21, 1959.

Polyoxymethylene polymers, having successively recurring —$CH_2O$— units are useful in the production of films and molded articles. For some purposes, as for example for better heat stability, better film clarity or better impact strength, random copolymers containing oxymethylene groups and other oxyalkylene groups have been prepared. These copolymers are generally less crystalline than oxymethylene homopolymers and some of their desired properties may be attributed to the lower crystallinity. However, in such random copolymers the crystallinity is often reduced to such an extent that other desired properties, such as high modulus and hardness are sacrified to some degree. By the production of block copolymers it is possible to reduce the crystallinity of the oxymethylene homopolymers to a useful degree without the excessive reduction in crystallinity which is reflected in the lowering of desirable physical constants. By the production of certain novel copolymers in accordance with one aspect of this invention a polymer with a high degree of thermal stability is obtained.

In accordance with one aspect of this invention a method of preparing block copolymers is provided which comprises copolymerizing a cyclic ether with the polymer of another cyclic ether, one of said cyclic ethers being trioxane and the other cyclic ether having at least two adjacent carbon atoms.

In accordance with a preferred aspect of this invention a block polymer is produced having a molecule with a middle segment consisting essentially of recurring oxymethylene groups and outer segments having recurring oxyalkylene groups with more than one carbon atom.

As stated above, a cyclic ether is copolymerized with the polymer of another cyclic ether. The latter may be designated as a prepolymer. The cyclic ether having at least two adjacent carbon atoms may be prepolymerized and reacted with trioxane or the trioxane may be prepolymerized to polyoxymethylene and reacted with the other cyclic ether. In the former instance a block copolymer is produced having a middle segment with recurring oxyalkylene groups with more than one carbon atom and outer segments consisting essentially of recurring oxymethylene groups. In the latter instance the middle segment consists essentially of recurring oxymethylene groups and the outer segments have the recurring higher oxyalkylene groups.

In accordance with one embodiment of this invention, a polymer of ethylene oxide, e.g., a polyethylene glycol having a molecular weight of about 400, is dissolved in molten trioxane containing a minor amount of boron trifluoride dibutyl etherate, as a catalyst, and maintained at about 60° C. for about 16 hours to produce a polymer having a middle segment of oxyethylene groups and outer segments of oxymethyelne groups.

In place of a polyethylene glycol, polymers of other cyclic ethers having at least two adjacent carbon atoms may be used. Among the suitable cyclic ethers which may be used in the prepolymers are 1,3-dioxolane, 1,3,5-trioxepane, 1,3-dioxane, trimethylene oxide, pentamethylene oxide, 1,2-propylene oxide, 1,2-butylene oxide, 1,3-butylene oxide, 2,2-di(chloromethyl) 1,3-propylene oxide, neopentyl formal, pentaerythritol diformal and tetrahydrofuran.

The cyclic ethers form prepolymers by the opening of the heterocyclic rings between a carbon atom and an oxygen atom and the linking of the thus opened rings. The preferred cyclic ethers are those producing oxyethylene groups, such as ethylene oxide, 1,3-dioxolane and 1,3,5-trioxepane. It is to be noted that oxymethylene groups may also be produced from some of the aforementioned cyclic ethers and would be present in the prepolymers from such ethers.

The molecular weight of the prepolymer may vary depending upon the nature of the product desired. Suitably the molecular weight of the prepolymer may vary from about 100 to about 40,000 with the preferable range being between about 500 and about 10,000.

The weight ratio of prepolymer to cyclic ether may also vary depending upon the nature of the product desired and the degree of polymerization anticipated. Suitably, the ratio of prepolymer to cyclic ether may vary from about 1:10 to about 10:1, with a preferable range being between about 1:4 and about 1:1.

The cyclic ethers may be readily polymerized with any cationic catalyst including such compounds as boron trifluoride, antimony trifluoride, antimony fluoborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, thionyl chloride, fluorosulfonic acid, phosphorus trichloride, titanium tetrachloride, ferric chloride, zirconium tetrachloride, aluminum trichloride, stannic chloride, stannous chloride, and the alkane sulfonic acids as ethane sulfonic acid and methane sulfonic acid.

The preferred catalysts are the boron fluoride-containing trioxane polymerization catalysts such as boron fluoride, itself, boron fluoride coordinate complexes with organic compounds in which oxygen or sulfur is the donor atom, boron fluoride coordinate complexes with water (such as boron fluoride monohydrate, boron fluoride dihydrate, and boron fluoride trihydrate) and boron fluoride coordinate complexes with basic trivalent nitrogen or phosphorous compounds which have ionization contants in water at 25° C. not higher than $1 \times 10^{-9}$. The coordinate complex of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether is the preferred coordinate complex. The boron fluoride complexes with phenol and with acetic acid are also very effective. Other specific boron fluoride complexes, for example, are the complexes with ethanol, methanol, propanol, butanol, methyl acetate, ethyl acetate, phenyl acetate, benzoic acid, acetic anhydride, acetone, methyl ethyl ketone, dimethyl ether, methyl phenyl ether, acetaldehyde, chloral, dimethyl sulfide, and ethyl mercaptan.

Suitable catalysts are disclosed in U.S. Pat. 2,989,505; 2,989,506; 2,989,507; 2,989,508; 2,989,509; all of Donald E. Hudgin and Frank M. Berardinelli; 2,989,510, of George J. Bruni; 2,989,511 of Arthur W. Schnizer, and in the article by Kern et al. in Angewandte Chemie 73, pp. 176–186 (Mar. 21, 1961).

The weight proportion of catalyst to total monomer (including prepolymer) may vary from about 0.001% to about 1.00% with 0.02% to about 0.60% being a preferred range. The weight proportion of the boron fluoride-containing catalysts are calculated on the boron-fluoride content.

In the process described above the polymer of ethylene oxide is said to be dissolved in the molten trioxane. From the range of proportions described above it is clear that the polymer of the ethylene oxide or other cyclic ether may be the major constituent. It is to be understood that the expression "dissolved in" as used herein with respect to particular constituents indicates that the constituents form a uniform single phase solution but does not indicate or imply that one constituent is present in greater quantity than another.

Some prepolymers of cyclic ethers having at least two adjacent carbon atoms, and particularly those of high molecular weight, may be insoluble or partially insoluble in the molten cyclic ether under the desired polymerization conditions. It is possible in such cases to copolymerize the cyclic ether with finely divided suspended particles of the prepolymer.

One may also, if desired, dissolve both the cyclic ether and the prepolymer in a common solvent. The use of a common solvent permits polymerization in liquid phase at temperatures below the normal melting point of trioxane. Cyclic hydrocarbons, such as benzene and cyclohexane are suitable solvents. Other suitable solvents include paraffinic hydrocarbons, such as propane, butane, pentane, and hexane, and halogenated hydrocarbons, such as ethylene dichloride.

Suitable polymerization temperatures may vary considerably depending upon the catalyst used, the amount and nature of the solvent used, if any, and the degree of prepolymer degradation which may be tolerated. Some prepolymers have a tendency to degrade under the polymerization conditions, particularly at higher temperatures. Such prepolymers are best copolymerized at lower temperatures in a solvent system although some compensation for degradation may be provided by starting with a prepolymer of higher molecular weight than the desired molecular weight of the corresponding polymer segment.

From about 10° C. to about 120° C. is a suitable range of temperatures for most copolymerizations in accordance with this invention, with the range from about 60° to 120° C. being preferred for non-solvent systems and the range from about 10° to 120° C. being preferred in systems containing a common solvent. Reactions under pressure permit polymerization temperatures above the boiling point of the solvent.

The period of reaction may vary with the variable process conditions above and also with the degree of polymerization desired. From about 1 to about 24 hours is a suitable reaction period.

The block copolymer product is a solid resinous product which is generally insoluble in the liquid reaction medium and easily separable therefrom by decantation and filtration, followed by washing with a solvent. In those cases where the prepolymer is insoluble in the reaction medium and reacted in particulate form, it may be separated from the block copolymer by selecting a different solvent or by using the same solvent at a higher temperature. In some cases, where substantially all of the prepolymer is reacted, it is unnecessary to subject the solid product to a separation treatment.

A preferred embodiment of the invention has been described above in connection with the aspect wherein trioxane is polymerized and wherein the prepolymer is formed from a cyclic ether having at least two adjacent carbon atoms. It is also applicable to novel block copolymers wherein a cyclic ether having at least two adjacent carbon atoms is copolymerized with polyoxymethylene, as a prepolymer. With respect to thermal stability, this product is particularly advantageous.

It is known that random copolymers of trioxane with cyclic ethers having at least two adjacent carbon atoms are more resistant to thermal degradation than homopolymers of trioxane. It is believed then an important aspect of thermal degradation of the homopolymer lies in the tendency for successive end units of oxymethylene to break off the polymer structure in an "unzippering" action and that the presence of an oxyethylene unit, for example, in the chain will stop the "unzippering" action and protect the oxymethylene units interior thereof. A block copolymer with an inner segment of oxymethylene units and outer segments of e.g. higher oxyalkylene units has its units of greater susceptibility to "unzippering" protected by units of lesser susceptibility and at the same time has a structure which permits higher crystallinity than the random copolymer.

The polymerization conditions for preparing block copolymers having oxymethylene inner segments are, in general similar to the polymerization conditions described above with respect to prepolymer molecular weights, proportions of prepolymer to monomer, type of catalyst, catalyst proportions and temperatures and period of reaction. However, where thermal stabilization is the sole purpose of the block copolymerization, it is preferred to use a prepolymer of high molecular weight and to use a high prepolymer to monomer ratio so that the outer segments are relatively short. A suitable range of molecular weight for this purpose is from about 10,000 to 40,000 and the prepolymer to monomer weight ratio is from about four to one, to about one to one.

In making block copolymers having oxymethylene inner segments, anionic and particularly alkaline catalysts, such as alkali metal hydroxides and particularly sodium hydroxide may be used in place of the boron trifluoride-containing trioxane polymerization catalyst where the monomer is anionically polymerizable. Dry, powdered sodium hydroxide may be employed, for example in proportions between about 0.01 to 0.2% based on the combined weight of monomer and prepolymer. The temperature for such polymerization is preferably from about 100° to about 160° C. and elevated pressure is employed when a relatively volatile monomer is used.

High molecular weight polyoxymethylene prepolymers may be reacted in finely divided particulate form or may be dissolved in a suitable solvent, such as dimethyl formamide.

The copolymerization products of this invention may be modified by chemical reaction at the end groups, as for example by esterification of the end groups with acetic anhydride for enhanced stability.

The block copolymers produced in accordance with this invention may be blended in molding compositions with plasticizers, fillers, pigments and thermal degradation stabilizers, such as 2,2'-methylene-bis (4-methyl-6-tertiary butyl phenol) and other phenolic materials.

EXAMPLE I

Ten grams of a polyethylene oxide polymer having a molecular weight range between about 380 and about 420, 40 grams of molten, filtered trioxane and 0.3 ml. of boron trifluoride dibutyl etherate are charged to a glass tube. The tube is sealed and rotated end over end in an oil bath maintained at 60° C. overnight. The tube is cooled and the solid product is removed. After three washings with acetone in a Waring Blendor and overnight drying at 60–70° C. 11.4 g. of a white powder, having a melting range of 152–163° C. is recovered. The carbon content of the product (average of two samples) is 40.35 wt. percent corresponding to an oxymethylene content of 97%. The intrinsic viscosity, measured at 0.1 wt. percent concentration in p-chlorophenol containing 2 wt. percent of α-pinene, is 0.26.

EXAMPLE II

Example I is repeated, except that a polyethylene oxide having a molecular weight of about 6000 is used as the prepolymer. 13.4 g. of a fluffy white powder having a melting range of 164°–172° C. is recovered. The product has a carbon content of 41.7 wt. percent, corresponding to a copolymer having 88% of oxymethylene units. The intrinsic viscosity (measured as above) is 0.27.

EXAMPLE III

Example I is repeated, except that the polyethylene oxide prepolymer has a molecular weight of about 9000, that the reaction is permited to continue for five days and that absolute alcohol is used for washing the product instead of acetone. 21.8 g. of white powder having a melting range of 165°–171° C. is recovered. The product has a carbon content of 44.15 wt. percent, corresponding to a copolymer having 71.2% of oxymethylene units. The intrinsic viscosity (measured as above) is 0.18.

EXAMPLE IV 40 grams of trioxane homopolymer, having an intrinsic viscosity of 1.5 (measured as above), 10 grams ethylene oxide, 200 grams of dimethyl formamide and 0.1 gram of dry, powdered sodium hydroxide are charged to a stainless steel tube. The mixture is heated in a rotating tube to a temperature of 140° C. for 22 hours while being permitted to develop an autogeneous pressure of about 3 atmospheres. The reaction mixture is evaporated to dryness and the solid residue is washed with water to remove unreacted ethylene oxide, polyethylene oxide, and catalyst.

It is to be understood that the foregoing detailed description is merely given by way of illustration and that many variations may be made therein without departing from the spirit of our invention.

Having described our invention, what we desire to secure by Letters Patent is:

1. A method of preparing moldable thermoplastic block copolymers which comprises copolymerizing in the presence of a catalyst a cyclic ether with the polymer of another cyclic ether, one of said cyclic ethers being trioxane and the other cyclic ether having at least two adjacent and no greater than 7 carbon atoms and from 1 to 4 oxygen atoms.

2. The method of claim 1 wherein the polymerization is conducted in the presence of a catalytic amount of an ionic polymerization catalyst.

3. The method of claim 1 wherein the polymerization is conducted in the presence of a catalytic amount of a trioxane polymerization catalyst.

4. The method of claim 1 wherein the polymerization is conducted in the presence of a catalytic amount of a boron fluoride containing catalyst.

5. The method of claim 1 wherein the polymerization is conducted in the presence of a catalytic amount of a cationic polymerization catalyst.

6. The method of claim 5 wherein the polymer of the cyclic ether is a linear polymer.

7. A method of preparing moldable thermoplastic block copolymers which comprises polymerizing in the presence of a catalyst a cyclic ether having at least 2 adjacent carbon atoms and no greater than 7 carbon atoms and from 1 to 4 oxygen atoms with polyoxymethylene.

8. The method of claim 7 wherein the polymerization is conducted in the presence of a cationic trioxane polymerization catalyst.

9. The method of claim 5 wherein the cyclic ether copolymerized with the polymer of another cyclic ether in a weight ratio of from about 10:1 to about 1:10 at a temperature between about 10° C. and 120° C. in the presence of a catalyst in an amount up to about 1.0 weight percent, based upon total monomer, one of the cyclic ethers being trioxane and the other cyclic ether having at least 2 adjacent carbon atoms and up to 7 carbon atoms and from 1 to 4 carbon atoms, said polymer having a molecular weight between about 100 and 40,000.

10. The method of claim 9 wherein said polymer contains oxyethylene groups.

11. The method of claim 9 wherein trioxane is copolymerized with the polymer of another cyclic ether in the presence of a cationic trioxane polymerization catalyst.

12. The method of claim 11 wherein said polymer has a molecular weight between about 100 and about 10,000, said trioxane is maintained in liquid phase and said polymerization takes place at a temperature between about 60° C. and about 120° C.

13. A method of preparing moldable thermoplastic block copolymers which comprises copolymerizing trioxane monomer with an ethylene oxide polymer having a molecular weight between about 100 and about 40,000, at a temperature between about 10° C. and about 120° C., in the presence of from about .001 to about 1.0 percent based upon the total weight of reactants, of a cationic trioxane polymerization catalyst.

14. The process of claim 7 wherein the polymerization is conducted in the presence of an anionic alkaline polymerization catalyst.

15. A moldable thermoplastic block copolymer consisting essentially of at least one segment consisting of recurring oxymethylene units and at least two segments consisting of recurring oxyalkylene units said block copolymer having a molecular weight of at least 10,000.

16. The product of claim 15 wherein the middle segment consists essentially of recurring oxymethylene groups and the outer segments having recurring oxyethylene groups.

17. A moldable thermally stable polyoxymethylene having improved base stability and having the formula:

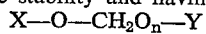

where X is a member of a class consisting of the groups having the formula

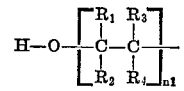

and alkyl groups of 1–5 carbon atoms, Y is a group having the formula:

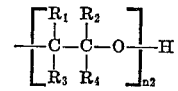

$n$ is a positive integer greater than 300, $n$, and $n_2$ are positive integers of 1–20 and $R_1$, $R_2$, $R_3$ and $R_4$ are members selected from the class consisting of hydrogen and alkyl groups of 1–2 carbon atoms.

18. The product of claim 17 wherein $R_1$, $R_2$, $R_3$ and $R_4$ are hydrogen and methyl groups and wherein at least one R is a methyl group and $n$, and $n_2$ are positive integers of 1–10.

19. The product of claim 17 wherein $R_1$, $R_2$, $R_3$ and $R_4$ are hydrogen and $n$ and $n_2$ are positive integers of 1–10.

20. A process for stabilizing a polyoxymethylene which comprises reacting in a mildly acidic reaction medium and polymerization catalyst, a polyoxymethylene starting material having a molecular weight of at least 10,000 with an alkylene oxide having the general formula:

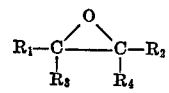

where $R_1$, $R_2$, $R_3$ and $R_4$ each individually are groups selected from the class consisting of hydrogen, and alkyl groups of 1–2 carbon atoms and recovering a moldable polyoxymethylene having improved thermal stability and a number average molecular weight of at least 10,000.

21. The process of claim 20 wherein one part by weight of a polyoxymethylene starting material having 1–2 of its terminal valences satisfied with a hydroxyl group is reacted with 1–10 parts of the alkylene oxide at a temperature of 10–120° C.

22. The process of claim 21 wherein said alkylene oxide is propylene oxide.

23. The process of claim 21 wherein said alkylene oxide is ethylene oxide.

24. The process of claim 23 is conducted in the presence of 0.001 to about 1.00 weight percent of the total monomer of boron trifluoride.

25. The process of claim 20 wherein the alkylene oxide is selected from the group consisting of:

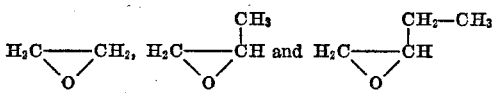

26. The process of claim 25 wherein the starting material having a molecular weight of from about 100 to about 40,000.

27. A thermally stable polyoxymethylene having the formula:

$$X-O-(CH_2O)_n-Y$$

where X is a member of a class consisting of the groups having the formula:

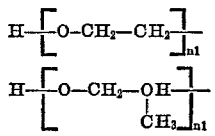

and

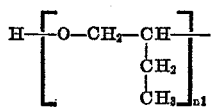

and Y is a member of a class consisting of the groups having the formula:

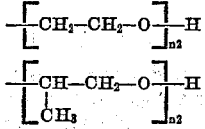

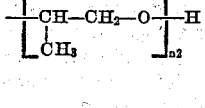

and

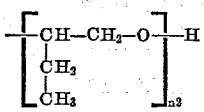

wherein $n$ is a positive integer greater than 300, $n$, and $n_2$ are positive integers of 1–10.

28. The product of claim 27 wherein $n$ and $n_2$ are positive integers of 1–20.

29. The product of claim 26 wherein the weight ratio of the polyoxymethylene starting material to the alkylene oxide being from 1:10 to about 10:1.

30. The product of claim 26 wherein the weight ratio of the polyoxymethylene starting material to the alkylene oxide being from about 4:1 to about 1:1.

References Cited

UNITED STATES PATENTS

| 3,027,352 | 3/1962 | Walling et al. | 260—67 FP |
| 3,183,211 | 5/1965 | Brinker et al. | 260—67 FP |

FOREIGN PATENTS

| 807,589 | 1/1959 | Du Pont | 260—67 FP |

WILLIAM H. SHORT, Primary Examiner

L. M. PHYNES, Assistant Examiner

U.S. Cl. X.R.

260—830 R, 45.95, 67 FP